United States Patent
Sella et al.

(10) Patent No.: US 10,367,715 B2
(45) Date of Patent: *Jul. 30, 2019

(54) PROXY OF ROUTING PROTOCOLS TO REDUNDANT CONTROLLERS

(71) Applicant: Level 3 Communications, LLC, Broomfield, CO (US)

(72) Inventors: William Thomas Sella, Parker, CO (US); James Michael Sella, Parker, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 189 days.

This patent is subject to a terminal disclaimer.

(21) Appl. No.: 15/180,936

(22) Filed: Jun. 13, 2016

(65) Prior Publication Data
US 2016/0294672 A1 Oct. 6, 2016

Related U.S. Application Data

(63) Continuation of application No. 14/840,947, filed on Aug. 31, 2015, now Pat. No. 9,379,966, which is a
(Continued)

(51) Int. Cl.
*H04L 12/751* (2013.01)
*H04L 12/24* (2006.01)
(Continued)

(52) U.S. Cl.
CPC .............. *H04L 45/02* (2013.01); *H04L 12/66* (2013.01); *H04L 41/12* (2013.01); *H04L 45/122* (2013.01);
(Continued)

(58) Field of Classification Search
CPC ......... H04L 41/12; H04L 45/02; H04L 45/04; H04L 45/122; H04L 45/26; H04L 45/54;
(Continued)

(56) References Cited

U.S. PATENT DOCUMENTS 8,649,497 B1 * 2/2014 Shea .................... H04L 65/1069
370/352
8,989,194 B1 * 3/2015 Poutievski .............. H04L 41/12
370/360
(Continued)

FOREIGN PATENT DOCUMENTS

CN 103532839 A 1/2014
CN 103597785 A 2/2014
(Continued)

OTHER PUBLICATIONS

International Search Report, dated Jul. 9, 2015, International Application No. PCT/US2015/024157, International Filing Date Apr. 2, 2015, 3 pages.
(Continued)

*Primary Examiner* — Dung B Huynh

(57) ABSTRACT

In an embodiment, a method exchanges routing data within a network including control and forwarding on separate devices. In the method, a first reachability information session is established between a forwarding device and a first control device and a second reachability information session is established between the forwarding device and a second control device. Also, a third reachability information session is established between the forwarding device and an external routing device. Finally, advertisements are exchanged between the first and second reachability information sessions and the third reachability information session such that the first and second control device appear to the external routing device to be a single device. System and computer program product embodiments are also disclosed.

21 Claims, 6 Drawing Sheets

Related U.S. Application Data continuation of application No. 14/250,141, filed on Apr. 10, 2014, now Pat. No. 9,124,507.

(51) Int. Cl.
| | | |
|---|---|---|
| *H04L 12/721* | (2013.01) | |
| *H04L 12/66* | (2006.01) | |
| *H04L 12/733* | (2013.01) | |
| *H04L 12/741* | (2013.01) | |
| *H04L 12/713* | (2013.01) | |
| *H04L 12/715* | (2013.01) | |

(52) U.S. Cl.
CPC .............. *H04L 45/26* (2013.01); *H04L 45/04* (2013.01); *H04L 45/54* (2013.01); *H04L 45/586* (2013.01); *H04L 45/64* (2013.01)

(58) Field of Classification Search
CPC ....... H04L 45/586; H04L 45/64; H04L 45/28; H04L 45/745; H04L 12/66
See application file for complete search history.

(56) References Cited

U.S. PATENT DOCUMENTS

| | | | |
|---|---|---|---|
| 9,450,817 B1* | 9/2016 | Bahadur | H04L 45/64 |
| 2003/0131028 A1 | 7/2003 | Radi | |
| 2003/0140165 A1* | 7/2003 | Chiu | H04L 45/02 709/238 |
| 2004/0107242 A1* | 6/2004 | Vert | H04L 67/104 709/203 |
| 2004/0202171 A1* | 10/2004 | Hama | H04L 12/4641 370/395.1 |
| 2004/0208189 A1 | 10/2004 | Fukuda | |
| 2005/0044037 A1* | 2/2005 | Lawrence | G06Q 20/04 705/38 |
| 2005/0276216 A1 | 12/2005 | Vasseur | |
| 2006/0053164 A1* | 3/2006 | Ewing | G06F 17/30306 |
| 2006/0092856 A1* | 5/2006 | Mitsumori | H04L 1/22 370/254 |
| 2006/0092857 A1 | 5/2006 | Ansari et al. | |
| 2006/0146857 A1* | 7/2006 | Naik | H04L 12/1428 370/432 |
| 2006/0291378 A1 | 12/2006 | Brotherston et al. | |
| 2007/0025353 A1* | 2/2007 | Nambisan | H04L 45/02 370/392 |
| 2007/0076591 A1 | 4/2007 | Khan | |
| 2007/0110017 A1 | 5/2007 | Fulknier et al. | |
| 2007/0223478 A1* | 9/2007 | Nishimura | H04L 45/00 370/392 |
| 2008/0062986 A1 | 3/2008 | Shand et al. | |
| 2008/0151755 A1 | 6/2008 | Nishioka | |
| 2008/0198859 A1* | 8/2008 | Elias | H04L 45/02 370/392 |
| 2008/0228940 A1* | 9/2008 | Thubert | H04L 29/12207 709/238 |
| 2008/0247335 A1* | 10/2008 | Rudnick | H04L 45/00 370/256 |
| 2009/0257440 A1 | 10/2009 | Yan | |
| 2010/0008361 A1* | 1/2010 | Guichard | H04L 45/00 370/392 |
| 2010/0322255 A1 | 12/2010 | Hao | |
| 2012/0014386 A1 | 1/2012 | Xiong et al. | |
| 2012/0176934 A1 | 7/2012 | Farinacci et al. | |
| 2012/0317307 A1 | 12/2012 | Ravindran et al. | |
| 2013/0151685 A1 | 6/2013 | Bursell | |
| 2013/0329601 A1* | 12/2013 | Yin | H04L 45/02 370/254 |
| 2014/0003227 A1 | 1/2014 | Scudder et al. | |
| 2014/0112122 A1* | 4/2014 | Kapadia | H04L 45/74 370/219 |
| 2014/0211615 A1* | 7/2014 | Murphy | H04L 12/28 370/228 |
| 2014/0211661 A1* | 7/2014 | Gorkemli | H04L 41/12 370/255 |
| 2014/0334286 A1* | 11/2014 | Ernstrom | H04L 45/04 370/216 |
| 2015/0117451 A1* | 4/2015 | Kaneriya | H04L 45/745 370/392 |
| 2016/0277210 A1* | 9/2016 | Lin | H04L 12/4625 |
| 2017/0317952 A1* | 11/2017 | Sillankorva | H04L 25/05 |

FOREIGN PATENT DOCUMENTS

| | | |
|---|---|---|
| EP | 2506505 A1 | 10/2012 |
| JP | 2010199800 | 9/2010 |

OTHER PUBLICATIONS

Written Opinion of the International Searching Authority, dated Jul. 9, 2015, International Application No. PCT/US2015/024157, International Filing Date Apr. 2, 2015, 5 pages.

U.S. Appl. No. 14/840,947, filed Aug. 31, 2015, Office Action Communication, dated Dec. 3, 2015, 10 pages.

U.S. Appl. No. 14/840,947, filed Aug. 31,2015, Notice of Allowance Communication, dated May 11, 2016, 7 pages.

U.S. Appl. No. 14/250,141, filed Apr. 10, 2014, Office Action Communication, dated Jun. 17, 2014, 39 pages.

U.S. Appl. No. 14/250,141, filed Apr. 10, 2014, Office Action Communication, dated Oct. 29, 2014, 39 pages.

U.S. Appl. No. 14/250,141, filed Apr. 10, 2014, Notice of Allowance Communication, dated Apr. 29, 2015, 15 pages.

Extended European Search Report, dated Oct. 16, 2017, Application No. 15777320.1, filed Apr. 2, 2015; 8 pgs.

"SPARC ICT-258457 Initial Split Architecture and Open Flow Protocol Study Deliverable 3.1", http://www.fp7-sparc.eu/assets/deliverables/D3-1-Initial-Split-Architecture-and-OpenFlow-Protocol-study.pdf; [Section7.4NetworkVirtualizationusingOpenFlow]; XP055139594 [retrieved on Sep. 11, 2014] Oct. 1, 2010 , 49 pgs.

Sherwood, Rob et al., "FlowVisor: A Network Virtualization Layer", Open Flow http://openflow.org/downloads/technicalreports/openflow-tr-2009-1-flowvisor.pdf [retrieved on Oct. 14, 2009] XP055091501 Oct. 14, 2009 , 15 pgs.

Chinese Examination Report, dated Dec. 15, 2017, Application No. 201580018996.1, filed Apr. 2, 2015; 25 pgs.

International Preliminary Report on Patentability, dated Oct. 12, 2016, Int'l Appl. No. PCT/US15/024157, Int'l Filing Date Apr. 2, 2015; 7 pgs.

Chinese Examination Report, dated Nov. 29, 2018, Application No. 201580018996.1, filed Apr. 2, 2015; 3 pgs.

Japan Notification of Reasons for Refusal, dated Mar. 7, 2019, Application No. 2016-560540, filed Apr. 2, 2015; 5 pgs.

* cited by examiner

PROXY OF ROUTING PROTOCOLS TO REDUNDANT CONTROLLERS

BACKGROUND

Field

This application is generally related to network routing.

Related Art

A communication network may, for example, provide a network connection that allows data to be transferred between two geographically remote locations. A network connection may span multiple links connecting communication devices such as routers. Networks may have different topologies depending on how the links are interconnected through communication devices. Given a particular network topology, multiple routes may be available between a source and destination. Some routes may be more desirable than others depending on current capacity and usage.

Traditional routing algorithms rely on local information each router has from its neighboring links and devices to route data. A router maintains such information in a routing table. The routing table has entries designating a next hop for various destination addresses, or groups of destination addresses. Based on the destination address of an incoming packet, a router uses its routing table to forward the packet to a specific neighboring device. To develop the routing table, each router uses a protocol like Border Gateway Protocol (BGP) to exchange routing and reachability information with local neighboring routers. In this way, each router both forwards packets and conducts control functions to update its own routing table.

While using local information may be desirable in some contexts, it may not always route data efficiently. To route data more efficiently, another technique, referred to as Software Defined Networks (SDNs), separates the control and forwarding functions into separate devices. The control device uses a global knowledge of the network topology to determine a path through the network of forwarding devices for individual data flows. In this way, the routing control device may, for example, establish paths that minimize delay or maximize bandwidth through the network.

BRIEF SUMMARY

In an embodiment, a method exchanges routing data within a network including control and forwarding on separate devices. In the method, a first reachability information session is established between a forwarding device and a first control device, and a second reachability information session is established between the forwarding device and a second control device. The first and second reachability information sessions enable the respective first and second control devices to send advertisements indicating what addresses are reachable through the network. Also, a third reachability information session is established between the forwarding device and an external routing device. The third reachability information session enables the forwarding device to exchange advertisements with the external routing device indicating what addresses are reachable through the respective forwarding and external routing devices. Finally, advertisements are exchanged between the first and second reachability information sessions and the third reachability information session such that the first and second control device appear to the external routing device to be a single device.

System and computer program product embodiments are also disclosed.

Further embodiments, features, and advantages of the invention, as well as the structure and operation of the various embodiments, are described in detail below with reference to accompanying drawings.

BRIEF DESCRIPTION OF THE DRAWINGS

The accompanying drawings, which are incorporated herein and form part of the specification, illustrate the present disclosure and, together with the description, further serve to explain the principles of the disclosure and to enable a person skilled in the relevant art to make and use the disclosure.

The drawing in which an element first appears is typically indicated by the leftmost digit or digits in the corresponding reference number. In the drawings, like reference numbers may indicate identical or functionally similar elements.

DETAILED DESCRIPTION

As described above, having a control device separate from the forwarding devices make routing decision can enable more intelligent routing decisions on a service provider network. But having a single control device creates a single point of failure. If that control device fails, no updates could be made to any of the routing tables on the forwarding devices. To deal with this, embodiments have multiple, redundant control devices.

But, having multiple control devices on a service provider network can make configuration difficult for users. In particular, the customer may have to configure its routers on its network to accept reachability information from multiple different control devices. This may involve configuring its routers to operate with multiple reachability information sessions, such as Border Gateway Protocol (BGP) sessions, that each provide reachability information to the customer routers. This configuration may be difficult. And having multiple reachability information sessions to the customer network may require transmission of extra traffic and involve extra processing overhead on the customer routers. While aspects are described with respect to customer networks and customer routing devices for illustrative purposes, a skilled artisan would recognize that embodiments apply to any external network, that is, any network external to the service provider network.

To deal with these issues of multiple control devices, embodiments provide an additional module on a forwarding device at the edge of the service provider network, where the service provider network interfaces with the customer network. The module masks the existence of the multiple control devices, making it appear to the customer that only a single control device is being used.

Specifically, the module establishes reachability information sessions, such as BGP sessions, with the customer routers and with each control device in the service provider network. The module exchanges routing data, such as route advertisements, obtained from the customer equipment's reachability information session and the control device's reachability information sessions. When the module receives a route advertisement from the customer equipment, it forwards it onto each of the control devices. And, when the control devices broadcast route advertisements, the module forwards only the first-received one onto the customer routing equipment. These and other embodiments are described below with respect to the accompanying figures.

Figure 1A:
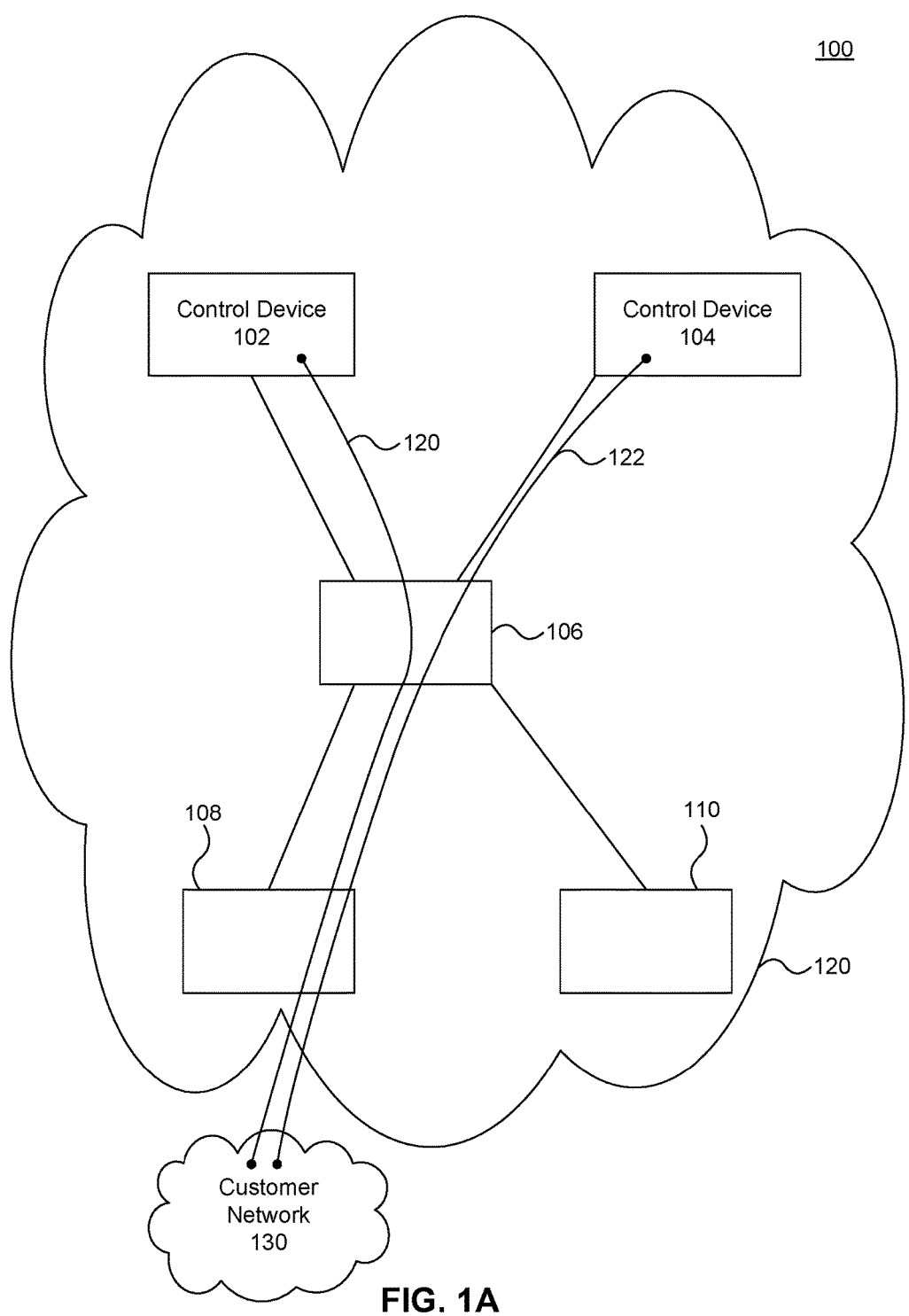
FIG. 1A is a diagram of a network having multiple, redundant control devices that are separate from the forwarding devices.

FIG. 1A is a diagram of a system 100 having multiple, redundant control devices that are separate from the forwarding devices.

System 100 includes a service provider network 120 and a customer network 130. Service provider network 120 may be a metropolitan area network (MAN) or wide area network (WAN) that connects at least two geographically disparate locations. Customer network 130, on the other hand, may be a local area network that, for example, connects different computers within a single entity or building.

Service provider network 120 includes a plurality of forwarding devices: forwarding devices 106, 108, and 110. Each forwarding device may have a plurality of ports and forward packets of data from one port to another. To forward the data, each forwarding device may have a routing table and may forward information according to information in its routing table. Specifically, the routing table may map particular addresses or subnets to particular output ports. When the forwarding device receives a packet of data, the forwarding device examines the packet's destination address to identify an entry in the routing table. In addition to examining the packet's destination address, the forwarding device examines any labels associated with packet, such as Multiprotocol Label Switching (MPLS) labels, to identify the entry in the routing table. That entry in the routing table specifies which port on the forwarding device to forward the packet.

Instead of configuring their own routing tables, in a software defined networks as disclosed herein, the forwarding devices' routing tables are configured by control devices. FIG. 1A depicts two control devices: control devices 102 and 104. Control devices 102 and 104 each may transmit information to forwarding devices 106, 108, and 110 to configure their routing tables. Control devices 102 and 104 may configure the routing tables to route data from a particular data flow along a particular path.

In embodiments, control devices 102 and 104 may be redundant. Each control device may have identical, or mirror image, information about the topology of service provider network 120 and may be able to determine identical paths through service provider network 120 independently of one another. By being redundant, if one of the control devices goes down, the other may continue to configure all of the forwarding devices on service provider network 120. While for illustration only two control devices are shown in FIG. 1A, a skilled artisan would recognize that additional control devices may be used and adding additional control devices would add additional redundancy to system 100.

In addition to configuring the routing tables of the forwarding devices in service provider network 120, control devices 102 and 104 may each establish respective reachability information sessions 120 and 122 with at least one device on customer network 130. The reachability information sessions may exchange routing and reachability information between service provider network 120 and the devices on customer network 130. Border gateway protocol (BGP) is a common type of reachability information session protocol, but other types of reachability information session protocols may be used, for example Open Shortest Path First (OSPF) and Intermediate System to Intermediate System (ISIS).

Control devices 102 and 104 may use the information received from customer network 130 over reachability information sessions 120 and 122 respectively to develop their knowledge of the global network topology. For example, customer network 130 may inform control devices 102 and 104, over reachability information sessions 120 and 122, that it includes or can reach a particular set of destination addresses (such as an IP address subnet). Based on this information, control devices 102 and 104 may update their respective models of the global network topology. And control devices 102 and 104 may use the updated information to determine the routing tables for forwarding devices 106-110.

The routing devices on customer network 130 may also use the information received over reachability information sessions 120 and 122 to configure their routing tables. Customer network 130 may include separate control and forwarding devices as similar to service provider network 120, or customer network 130 may include routers and switches that both forward data, and control and calculate their own routing tables. Either way, the routing devices on customer network 130 use the reachability information received from reachability information sessions 120 and 122 to configure their routing tables. They configure their routing tables such that data destined for an address reachable through service provider network 120 can be forwarded to service provider network 120.

Having multiple control devices in this way may add to redundancy. But having multiple reachability information sessions 120 and 122 may increase the burden on the customer of configuring devices on customer network 130. Specifically, a customer may have to configure its devices to operate with both reachability information session 120 and 122. For an administrator of customer network 130 that may be unfamiliar with service provider network 120, this configuration can be burdensome. To deal with this issue, embodiments aggregate data from the different control devices 102 and 104 to make for a single reachability information session with customer network 130 as illustrated in FIG. 1B.

Figure 1B:
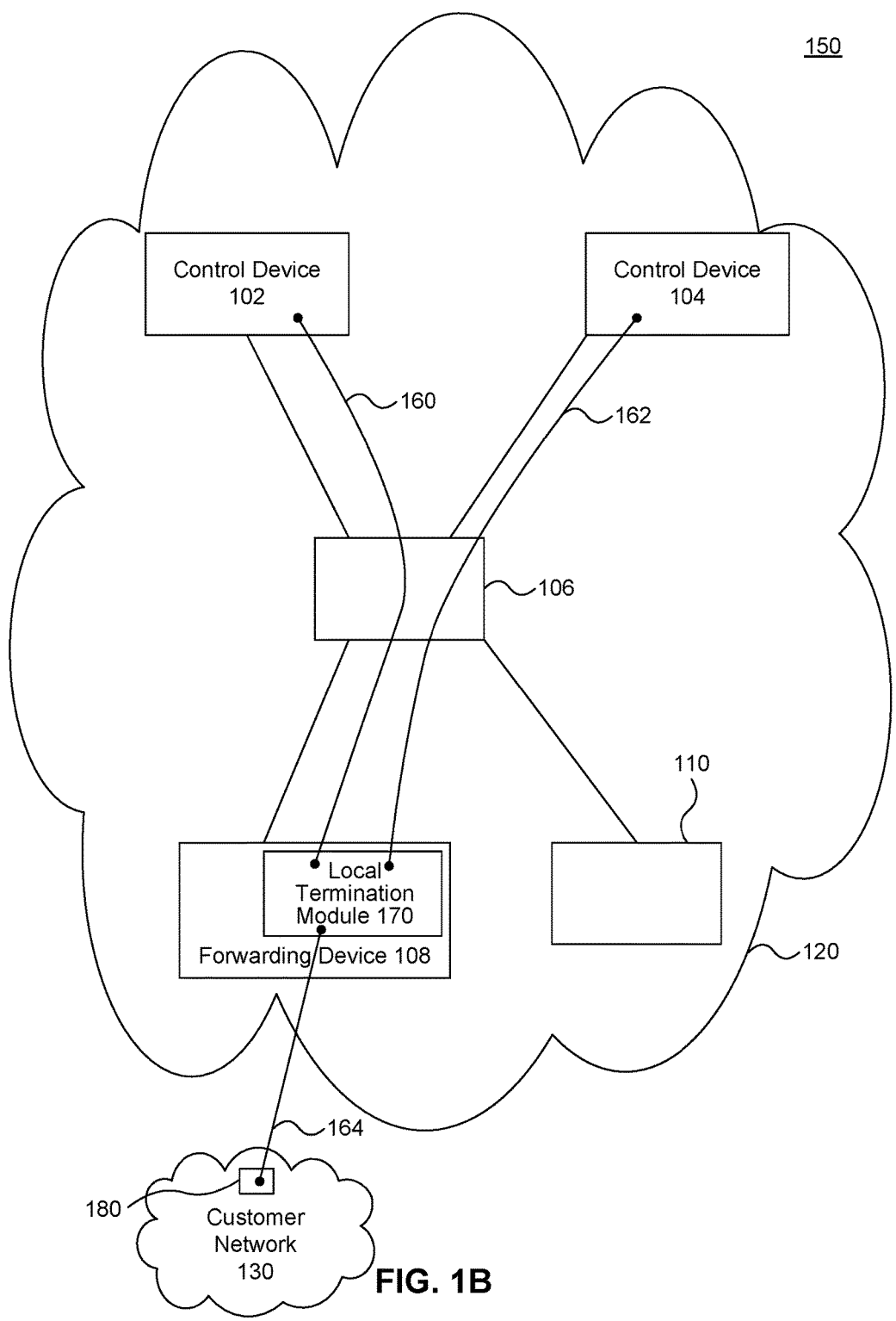
FIG. 1B is a diagram of a network having a local termination module that masks the multiple control devices to an external network.

FIG. 1B illustrates a system 150 that has a local termination module 170 that masks the multiple control devices to a customer network. Like system 100 in FIG. 1A, system 150 has a customer network 130, which includes a customer routing device 180, and a service provider network 120, which in turn has two control devices (102 and 104) and three forwarding devices (106, 108, and 110).

Some forwarding devices reside on an edge of service provider network 120, meaning that they directly connect to an outside network. According to embodiment, it is these edge forwarding devices that include a local termination module. In system 150, forwarding device 108 is an edge forwarding device, because it connects with customer network 130. Accordingly, forwarding device 108 includes local termination module 170.

Local termination module 170 establishes a reachability information session with the external network that its forwarding device is connected to and with each control device on service provider network 120. Here, local termination module 170 establishes a reachability information session 164 with customer network 130, and reachability information sessions 160 and 162 with control devices 102 and 104 respectively. Local termination module 170 acts as a proxy for the reachability information sessions exchanging messages between them.

In particular, local termination module 170 exchanges messages between reachability information sessions 160, 162, and 164 to make the multiple control devices 102 and 104 appear to customer routing device 180 to be a single device. For example, local termination module 170 may receive an advertisement from customer routing device 180 via the reachability information session 164. The advertisement may include reachability information, and the reachability information may indicate which addresses customer routing device 180 can forward information received from service provider network 120 to. When local termination module 170 receives the advertisement, it sends the enclosed reachability information to the control devices 102 and 104 via the reachability information sessions 160 and 162. Using the reachability information, control devices 102 and 104 may update their knowledge of the network topology. And control devices 102 and 104 use the updated network topology to determine routing tables for forwarding devices 106, 108, and 110 with respect to those addresses in the reachability information. Specifically, control devices 102 and 104 may add entries to the routing tables to route data destined for addresses within customer network 130, and reachable from customer network 130, toward customer network 130. Then, control devices 102 and 104 transmit the updated routing tables to forwarding devices 106, 108, and 110, enabling forwarding devices 106, 108, and 110 to route data to customer network 130.

Because local termination module 170 has reachability information sessions 160 and 162 with both control device 102 and 104, it will receive reachability information from both. And because control device 102 and 104 are redundant, and potentially mirror images of each other, the information received from control devices 102 and 104 will be duplicative. When duplicative information is received, local termination module 170 may only forward on the first-received information. To determine whether reachability information has been previously sent, local termination module 170 may store the reachability information, or an identification of it such as a hash. When local termination module 170 receives reachability information from a control device, it may check the storage to determine whether the reachability information has been previously forwarded to the customer routing device. Then, depending on the check, it may forward the information.

In an example operation, local termination module 170 may receive an advertisement from control device 102 via reachability information session 160. The advertisement may include reachability information that in turn includes a number of entries. Each entry may map destination addresses reachable through service provider network 120 to a next hop address. When local termination module 170 receives the advertisement, local termination module 170 may check its local storage to determine whether it has already sent. If it has already been sent, local termination module 170 does nothing. If it has not already been sent, local termination module 170 may forward on the data to customer routing device 180.

Figure 2A:
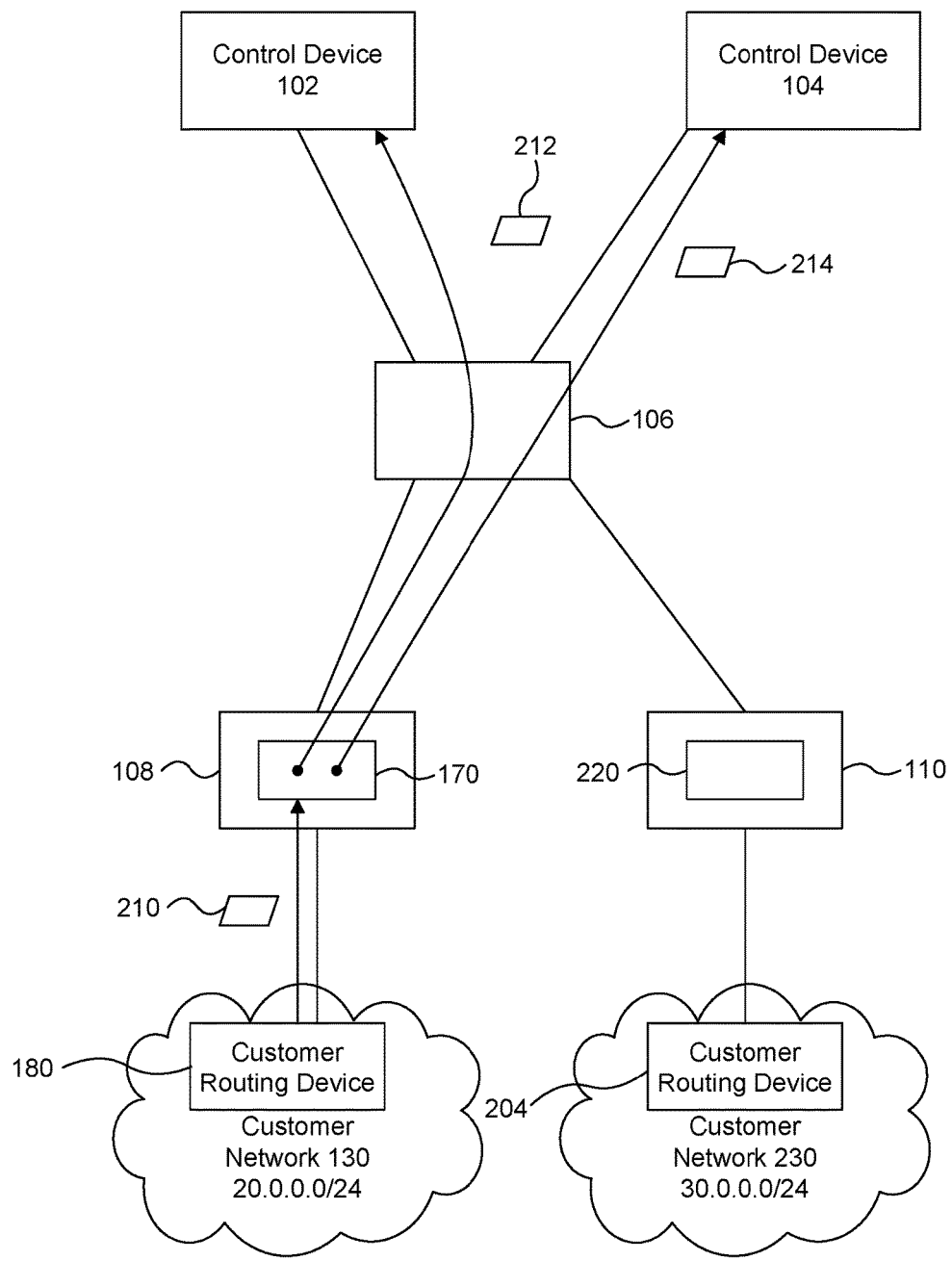
FIGS. 2A-B are diagrams illustrating an example operation of the system in FIG. 1.
Figure 2B:
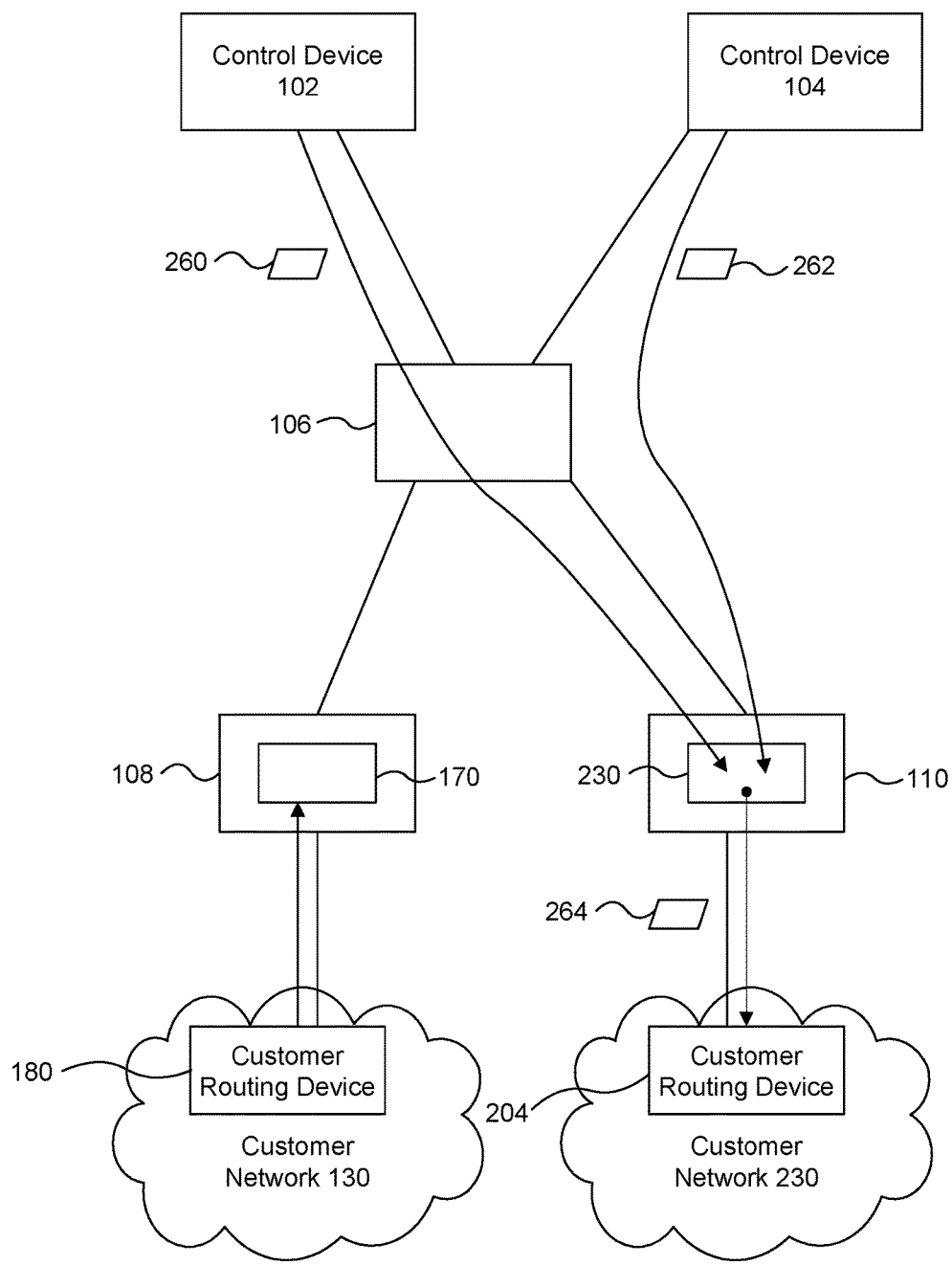

FIGS. 2A-B are diagrams showing a system 200 that illustrates how reachability information is propagated from one network to another. In addition to the components of system 150, system 200 includes a customer network 230 that includes a routing device 204. Routing device 204 is connected to the service provider network at forwarding device 110. In system 200, forwarding device 110, being an edge forwarding device, includes a local termination module 220.

As illustrated in FIG. 2A, customer network 130 has an address space of 20.0.0.0/24. It has been assigned the IP addresses within that space, and so any packets addressed to an IP address whose first three bytes represent 20.0.0 should be routed to customer network 130. Similarly, customer network 230 has an address space of 30.0.0.0/24. It too has been assigned those IP addresses, and so any packets addressed to an IP address whose first three bytes represent 30.0.0 should be routed to customer network 230.

When customer network 130's routing device 180 is attached to forwarding device 108, it sends an advertisement message 210. Advertisement message 210 includes reachability information indicating that the 20.0.0.0/24 subnet is addressable through customer routing device 180.

Forwarding device 108 receives advertisement message 210 and forwards its reachability information onto both control devices in two separate routing messages: routing messages 212 and 214 for control devices 102 and 104 respectively. Control devices 102 and 104 update their model of the global network topology according to the reachability information in messages 212 and 214. As described above with respect to FIG. 1B, it uses this information to update the routing tables of forwarding devices 106, 108, and 110 to route traffic addressed to 20.0.0.0/24 to customer routing device 180. In addition to updating the routing tables of the devices on the service provider network, control devices 102 and 104 can also send routing advertisements to other external networks as illustrated in FIG. 2B.

FIG. 2B illustrates how control devices 102 and 104 advertise reachability information to customer network 230. As mentioned above, control devices 104 have each updated their models of the global network topology to reflect the fact that 20.0.0.0/24 is reachable through customer network 130, which is connected to the service provider network at forwarding device 108. In FIG. 2B, control devices 102 and 104 advertise to customer network 230 that 20.0.0.0/24 is reachable through the service provider network.

Control devices 102 and 104, having both updated their topology models, each send a respective advertisement 260 and 262 to forwarding device 110 and its local termination module 230. Advertisements 260 and 262 include reachability information indicating that the destination addresses within the subnet 20.0.0.0/24 are reachable though the service provider network and specifically forwarding device 110. The reachability information may have a next-hop IP address to reach 20.0.0.0/24 as the IP address of forwarding device 110.

Suppose advertisement 260 reaches forwarding device 110 first. Local termination module 230 stores the reachability information, or a hash of the reachability information, in a local storage and sends the reachability information onto customer routing device 204 in an advertisement 264. Based on advertisement 264, customer routing device 204 configures its routing table according to the reachability information. For example, customer routing device 204 may configure its routing table to route traffic addressed to the subnet 20.0.0.0/24 to forwarding device 110.

When advertisement 262 reaches forwarding device 110, local termination module 230 compares advertisement 262's reachability information with the local storage. It determines that advertisement 262's reachability information is stored in the local storage. And, accordingly, it does not forward the reachability information onto customer network 230.

Figure 3:
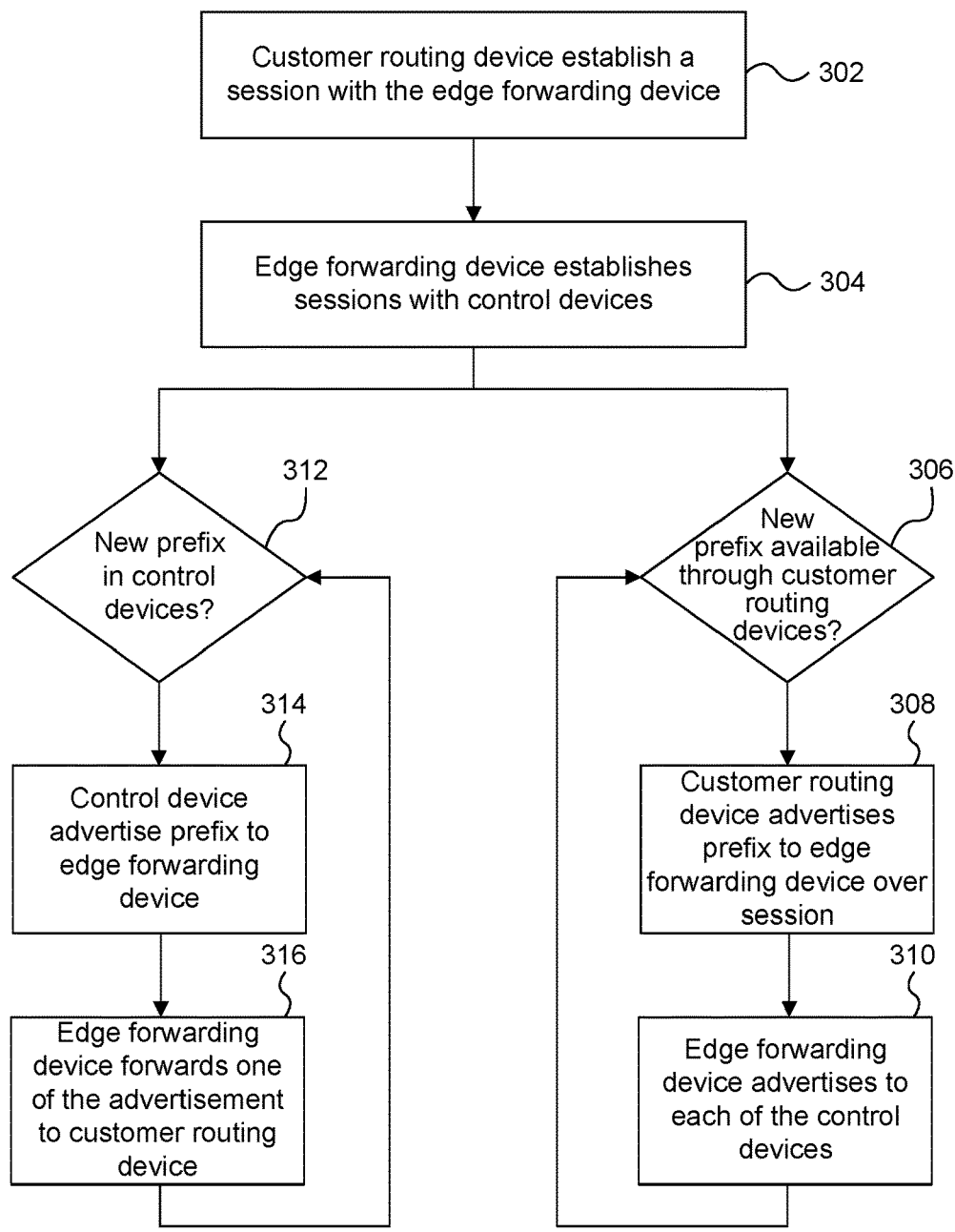
FIG. 3 is a flowchart of a method for masking redundant controllers, according to an embodiment.

FIG. 3 is a flowchart of a method 300 for masking redundant controllers, according to an embodiment.

Method 300 begins at step 302 when a customer routing device establishes a reachability information session with the edge forwarding device. Step 302 may occur when the customer routing device and the edge forwarding device discover that they are physically connected to each other. The reachability information session created at step 302 enables the forwarding device to exchange advertisements with the customer routing device. Advertisements from the customer routing device may indicate what addresses are reachable through the customer routing device on the customer network. And advertisements from the forwarding device may indicate what addresses are reachable through the forwarding device on the service provider network.

Once the customer routing device establishes the reachability information session at step 302, the edge forwarding device establishes reachability information sessions with each control device on the service provider network at step 304. These reachability information sessions enable the respective first and second control devices to send advertisements indicating what addresses are reachable through the service provider network to the forwarding device.

Once the reachability information sessions are established, the routing devices start exchanging reachability information. When the control devices learn that a new address prefix is available through the service provider network at decision block 312, each of the control devices advertise the prefix to the edge forwarding device at step 314. Then, the edge forwarding forwards one of the advertisements onto the customer routing device at step 316 and discards the other. Steps 314 and 316 may execute to communicate all accessible prefixes when the session is first established. Then, as illustrated in FIG. 3, steps 314 and 316 may execute incremental updates as the control devices learn that new prefixes are accessible.

Similarly, when the customer routing device learn that a new address prefix is available through the customer network at decision block 306, the customer routing device advertises the prefix to the edge forwarding device at step 308. Then, the edge forwarding forwards the advertisement to each control device at step 310. Steps 308 and 310 may execute to communicate all accessible prefixes when the session is first established. Then, as illustrated in FIG. 3, steps 308 and 310 may execute incremental updates as the customer routing device learns that new prefixes are accessible.

Figure 4:
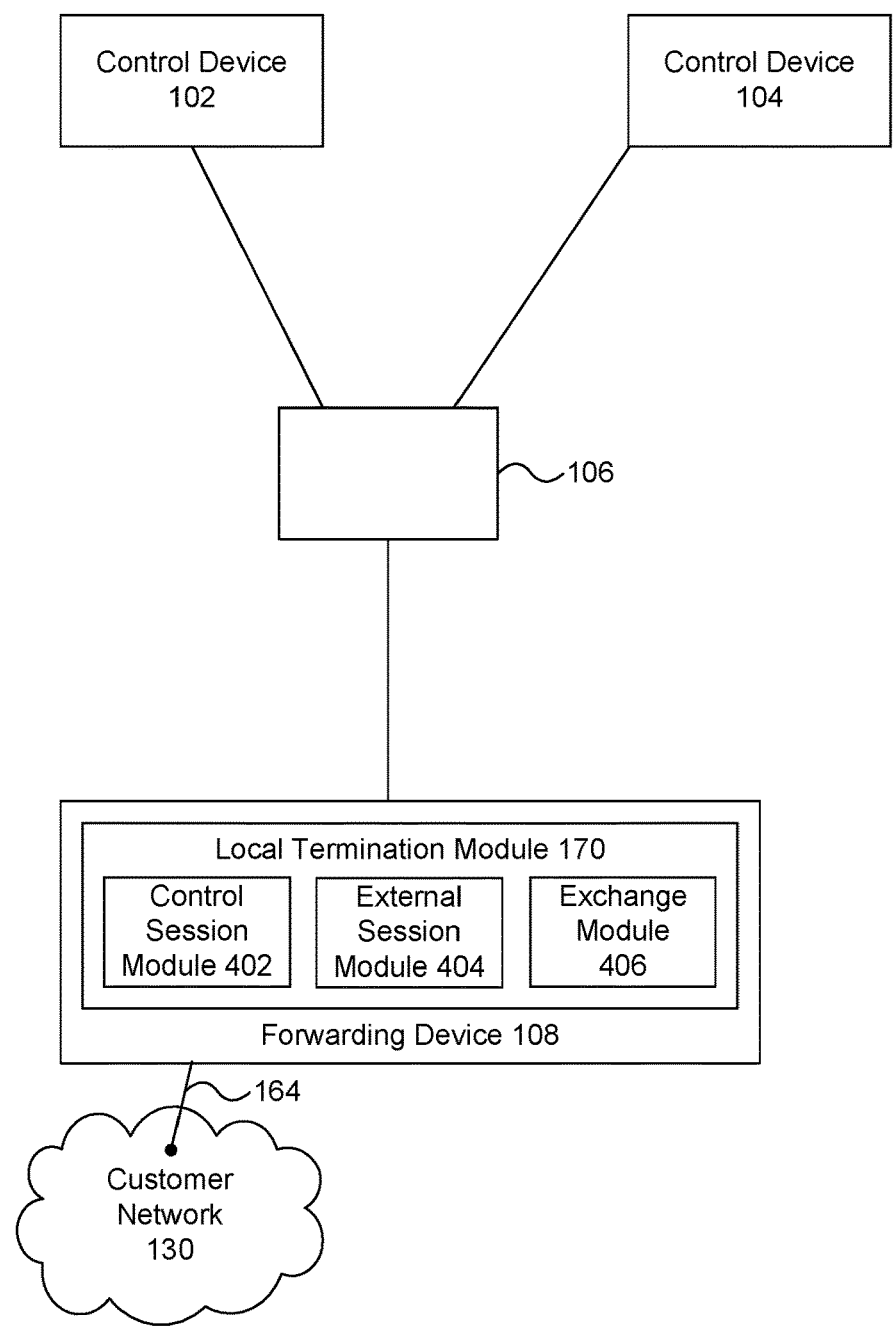
FIG. 4 is a diagram showing the system of FIG. 1 in greater detail.

FIG. 4 is a diagram showing a system 400 that illustrates components of the local termination module 170 in greater detail. Local termination module 170 includes three sub-modules: control session module 402, external session module 404, and exchange module 406.

Control session module 402 establishes the reachability information sessions between forwarding device 108 and control devices 102 and 104 as described above for example with respect to step 302. External session module 404 establishes a reachability information session between the forwarding device and a customer routing device with respect to 304.

Exchange module 406 exchanges advertisements between the first and second reachability information sessions and the third reachability information session such that the first and second control device appear to the customer routing device to be a single device. Exchange module 406 may send messages as illustrated in steps 306-316 in FIG. 3.

Each of the devices and modules disclosed herein may be implemented in hardware, software, firmware, or any combination thereof.

Each of the devices and modules disclosed herein may be implemented on the same or different computing devices. Such computing devices can include, but are not limited to, a personal computer, a mobile device such as a mobile phone, workstation, embedded system, game console, television, set-top box, or any other computing device. Further, a computing device can include, but is not limited to, a device having a processor and memory, including a non-transitory memory, for executing and storing instructions. The memory may tangibly embody the data and program instructions. Software may include one or more applications and an operating system. Hardware can include, but is not limited to, a processor, a memory, and a graphical user interface display. The computing device may also have multiple processors and multiple shared or separate memory components. For example, the computing device may be a part of or the entirety of a clustered or distributed computing environment or server farm.

Identifiers, such as "(a)," "(b)," "(i)," "(ii)," etc., are sometimes used for different elements or steps. These identifiers are used for clarity and do not necessarily designate an order for the elements or steps.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method for exchanging routing data from redundant controllers, comprising:
   (a) establishing, at a routing device, a first reachability information session between the routing device and a forwarding device in a network, wherein the first reachability information session enables the routing device to exchange advertisements with the forwarding device indicating which addresses are reachable through the respective routing and forwarding devices,
   wherein the forwarding device is further part of: (i) a second reachability information session established between the forwarding device and a first control device, the second reachability session enabling the first control device to send advertisements indicating which addresses are reachable through the network, and (ii) a third reachability information session established between the forwarding device and a second control device, the third reachability information session enabling the second control device to send advertisements indicating which addresses are reachable through the network;

(b) receiving, at the routing device, an advertisement from the forwarding device via the first reachability session, the advertisement comprising information specifying how the routing device is to forward data to destination addresses, wherein the forwarding device does not send advertisement information to the routing device when a duplicative advertisement is received by the forwarding device from the first control device or the second control device; and (c) configuring, by the routing device, a routing table based on the information obtained in (b).

2. The method of claim 1, further comprising: selecting, by the routing device, an output port of the routing device based on a destination address of the data or a label of the data in the configured routing table in (c), forwarding, by the routing device, the data to the output port.

3. The method of claim 1, further comprising:
sending, by the routing device, a first advertisement to the forwarding device via the first reachability information session, the first advertisement comprising reachability information indicating which addresses the routing device is able to forward information to,
wherein the forwarding device sends: (i) a second advertisement comprising the reachability information received in the first advertisement to the first control device via the second reachability session to update how the first control device specifies how the forwarding device is to forward data to the addresses indicated in the reachability information, and (ii) a third advertisement comprising the reachability information received in the first advertisement to the second control device via the third reachability session to update how the second control device specifies how the forwarding device is to forward to the addresses indicated in the reachability information.

4. The method of claim 1, further comprising:
receiving, by the routing device, an advertisement from the forwarding device via the first reachability session comprising reachability information received by the forwarding device from a first control advertisement from the first control device via the second reachability session if the forwarding device determines that the reachability information received in the first control advertisement has not already been sent to the routing device, and
receiving, by the routing device, an advertisement from the forwarding device via the first reachability session comprising reachability information received by the forwarding device from a second control advertisement from the second control device via the third reachability session when the forwarding device determines that the reachability information received in the second control advertisement has not already been sent to the routing device.

5. The method of claim 4, wherein the first control device and the second control device appear as a single device to the routing device.

6. The method of claim 4, further comprising: when the second control device is deactivated, continuing to receive, by the routing device, an advertisement from the forwarding device via the first reachability session comprising reachability information received by the forwarding device from the first control device.

7. The method of claim 1, wherein at least one of the first, second and third reachability information sessions is a Border Gateway Protocol Control session.

8. The method of claim 1, wherein at least one of the first, second and third reachability information sessions is an Open Shortest Path First session.

9. The method of claim 1, wherein at least one of the first, second and third reachability information sessions is an Intermediate System to Intermediate System session.

10. A system for exchanging routing data from redundant controllers, comprising:
a memory; and
one or more processors coupled to the memory, and configured to:
establish, at a routing device, a first reachability information session with a forwarding device such that the first reachability information session enables the routing device and the forwarding device to exchange advertisements indicating what addresses are reachable through the respective routing and forwarding devices;
wherein the forwarding device is further part of:
(i) a second reachability information session established between the forwarding device and a first control device, the second reachability session enabling the first control device to send advertisements indicating what addresses are reachable through the network, and
(ii) a third reachability information session established between the forwarding device and a second control device, the third reachability session enabling the second control device to send advertisements indicating what addresses are reachable through the network; and
receive, at the routing device, an advertisement from the forwarding device via the first reachability session, the advertisement comprising information specifying how the routing device is to forward data to destination addresses, wherein the forwarding device does not send advertisement information to the routing device when a duplicative advertisement is received by the forwarding device from the first control device or the second control device,
configure, at the routing device, a routing table based on the information obtained over the first reachability session from forwarding device.

11. The system of claim 10, the one or more processors further configured to:
send, by the routing device, a first advertisement to the forwarding device via the first reachability session, the advertisement comprising reachability information indicating which addresses the routing device is able to forward information to, wherein the forwarding device sends:
(i) a second advertisement comprising the reachability information received in the first advertisement to the first control device via the second reachability session to update how the first control device specifies how the forwarding device is to forward data to the addresses indicated in the reachability information, and
(ii) a third advertisement comprising the reachability information received in the first advertisement to the second control device via the third reachability session to update how the second control device specifies how the forwarding device is to forward to the addresses indicated in the reachability information.

12. The system of claim 10, the one or more processors further configured to:
receive, by the routing device, an advertisement from the forwarding device via the first reachability session comprising reachability information received by the forwarding device from a first control advertisement from the first control device via the second reachability session if the forwarding device determines that the reachability information received in the first control advertisement has not already been sent to the routing device, and receive, by the routing device, an advertisement from the forwarding device via the first reachability session comprising reachability information received by the forwarding device from a second control advertisement from the second control device via the third reachability session if the forwarding device determines that the reachability information received in the second control advertisement has not already been sent to the routing device.

13. The system of claim 12, the one or more processors configured to:
when the second control device is deactivated, continue to receive, by the routing device, an advertisement from the forwarding device via the first reachability session comprising reachability information received by the forwarding device from the first control device.

14. The system of claim 12, wherein the first control device and the second control device appear as a single device to the routing device.

15. The system of claim 10, wherein at least one of the first, second and third reachability information sessions is a Border Gateway Protocol Control session.

16. The system of claim 10, wherein at least one of the first, second and third reachability information sessions is an Open Shortest Path First session.

17. A non-transitory program storage device tangibly embodying a program of instructions executable by at least one machine to perform a method for exchanging routing data with a network including a routing device, a separate control device, and plurality of forwarding devices, the method comprising:
(a) establishing, with a routing device, a first reachability information session between a routing device and a forwarding device from the plurality of forwarding devices such that the first reachability information session enables the routing device to exchange advertisements with the forwarding device indicating what addresses are reachable through the respective routing and forwarding devices, wherein the forwarding device is further part of:
(i) a second reachability information session established between the forwarding device and a first control device, the second reachability session enabling the first control device to send advertisements indicating what addresses are reachable through the network, and
(ii) a third reachability information session established between the forwarding device and a second control device, the third reachability session enabling the second control device to send advertisements indicating what addresses are reachable through the network;
(b) receiving, at the routing device, an advertisement from the forwarding device via the first reachability session comprising information specifying how the routing device is to forward data to destination addresses, wherein the forwarding device does not send advertisement information to the routing device when a duplicative advertisement is received by the forwarding device from the first control device or the second control device; and
(c) configuring, by the routing device, its routing table based on the information obtained in (b).

18. The non-transitory program storage device of claim 17, the method further comprising:
sending, by the routing device, a first advertisement to the forwarding device via the first reachability information session, the first advertisement comprising reachability information indicating which addresses the routing device is able to forward information to, wherein the forwarding device sends:
(i) a second advertisement comprising the reachability information received in the first advertisement to the first control device via the second reachability session to update how the first control device specifies how the forwarding device is to forward data to the addresses indicated in the reachability information, and
(ii) a third advertisement comprising the reachability information received in the first advertisement to the second control device via the third reachability session to update how the second control device specifies how the forwarding device is to forward to the addresses indicated in the reachability information.

19. The non-transitory program storage device of claim 17, wherein at least one of the firsts, second and third reachability sessions is a Border Gateway Protocol Control session.

20. The non-transitory program storage device of claim 17, wherein at least one of the firsts, second and third reachability sessions is an Open Shortest Path First session.

21. The method of claim 1, wherein the forwarding device sends advertisement information to the first control device and the second control device when a duplicative advertisement is received by the forwarding device.

* * * * *